May 11, 1965  G. L. WAGNER  3,182,829
VEHICULAR LIFTING YOKE ASSEMBLY
Filed Nov. 27, 1961  2 Sheets-Sheet 1

INVENTOR.
George L. Wagner
BY
Hovey, Schmidt, Johnson & Hovey
ATTORNEYS.

May 11, 1965    G. L. WAGNER    3,182,829
VEHICULAR LIFTING YOKE ASSEMBLY
Filed Nov. 27, 1961    2 Sheets-Sheet 2
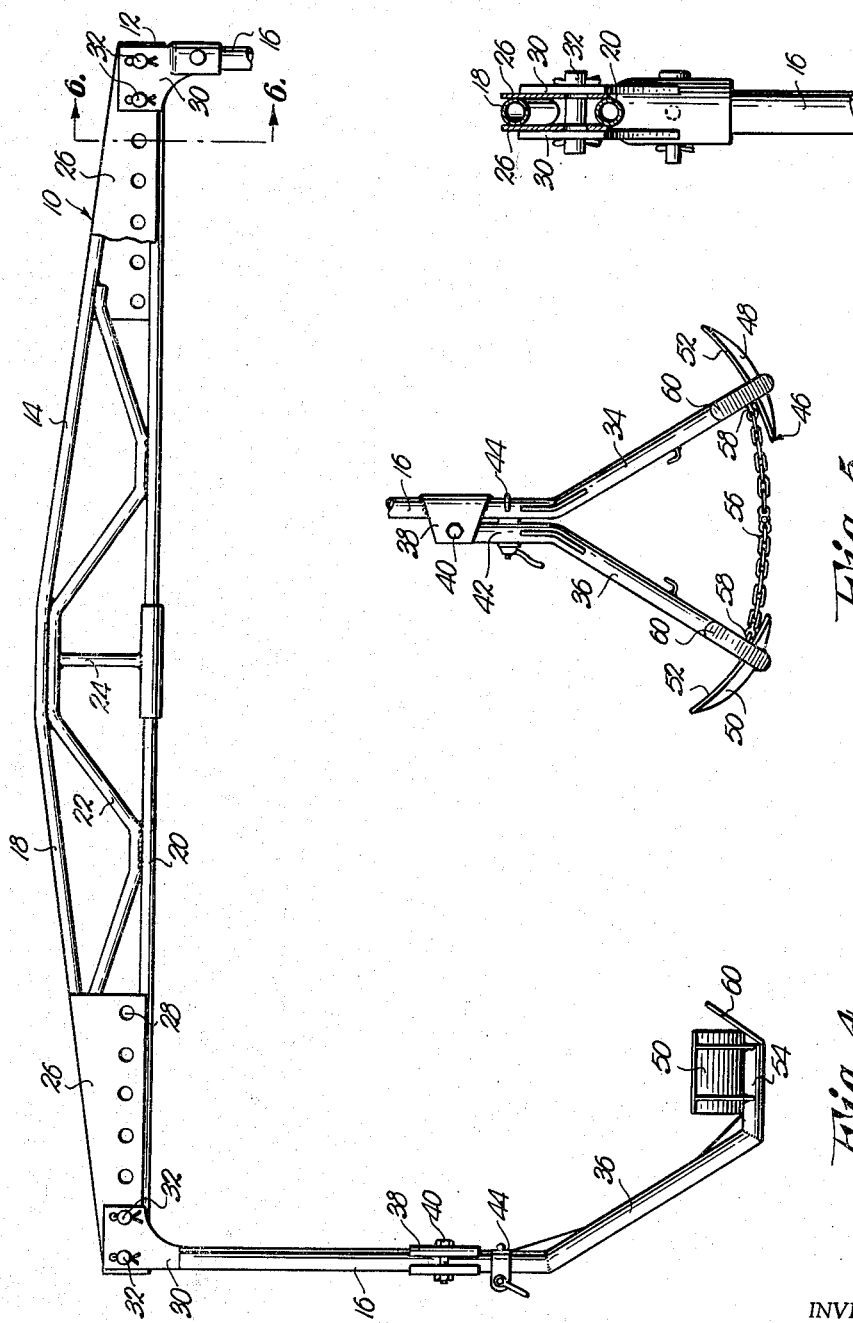
INVENTOR.
George L. Wagner
BY
Hovey, Schmidt, Johnson & Hovey
ATTORNEYS.

3,182,829
VEHICULAR LIFTING YOKE ASSEMBLY
George L. Wagner, 421 S. Walnut, Maryville, Mo.
Filed Nov. 27, 1961, Ser. No. 154,999
1 Claim. (Cl. 214—86)

This invention relates to lifting or elevating structure, and more particularly, to means for engaging the wheels at one end of a vehicle for elevating said one end above ground level.

It is the primary object of the present invention to provide structure for elevating one end of a vehicle by engaging the wheels at said one end to thereby raise the wheels above ground level, to in turn elevate the said one end, whereby the vehicle may then be towed on the wheels at the opposite end thereof, thus precluding the necessity of interconnecting the axle or the bumper of the vehicle to the towing device to thereby preclude damage to the vehicle in the areas of the bumper and axle thereof while the vehicle is being towed.

Another object of the present invention is the provision of lifting structure of the type described, wherein is included a substantially U-shaped frame adapted to straddle the end of the vehicle to be elevated and saddle means carried by the frame at the lowermost ends thereof for engaging the wheels at the end of the vehicle, whereby when the frame is raised, the saddle means is disposed beneath the corresponding wheel to support the latter and thus permit lifting of the wheel above ground level to in turn elevate the end of the vehicle for subsequent towing.

Still another object of the present invention is the provision of a pair of arms which carry the saddle means at the lower ends thereof forming a part of the frame and swingably mounted on a bight for lateral swinging movement relative to the wheels of the vehicle, whereby the saddle means carried by each arm, may be moved into operative position adjacent the corresponding wheel without having to move the vehicle prior to towing of the latter.

Other objects of this invention will become apparent as the following specification progresses, reference being had to the accompanying drawings, wherein:

FIG. 4 is an enlarged, front elevational view of the apparatus for elevating one end of a vehicle, parts being broken away to illustrate details of construction;

FIG. 5 is a fragmentary view of the saddle means at each end of the apparatus illustrated in FIG. 4 for engaging a corresponding wheel of the vehicle to be elevated; and FIG. 6 is an enlarged, fragmentary, cross-sectional view taken along line 6—6 of FIG. 4.

Figure 1:
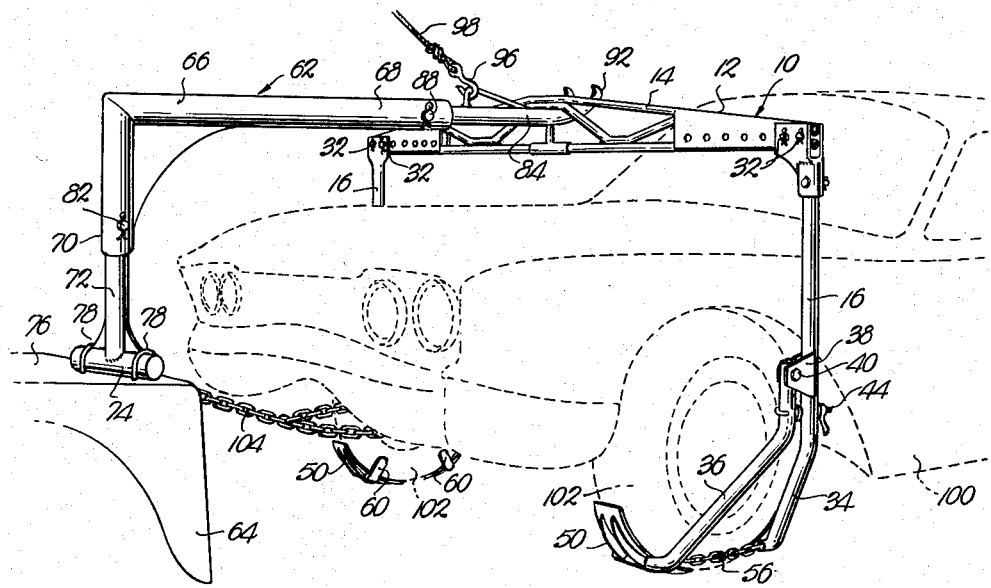
FIGURE 1 is a perspective view of the apparatus for elevating one end of a vehicle and showing the operative position of the apparatus when viewing an automobile, the latter being illustrated in dashed lines.

The present invention provides a substantially U-shaped frame comprised of a bight and a pair of arms secured to the bight at each end of the latter in depending relationship thereto. Saddle means is provided for the lower end of each arm for disposition beneath a corresponding wheel, whereby when the bight is raised by a lifting device, the arms are in turn lifted to thereby elevate the saddle means and the end of the vehicle over which the bight is disposed.

A pair of relatively shiftable fingers are secured to the lower end of each arm and mount the saddle means, the latter being in the nature of a pair of spaced shoes engageable with the wheel at spaced portions thereon. The arms are mounted on the bight for lateral swinging movement relative to the vehicle so that the shoes may be moved into operative positions relative to a corresponding wheel when the fingers are slightly swung apart. Thereupon, the fingers are brought together by take-up means to clamp the shoes to the wheels in supporting relationship to the latter.

The apparatus which forms the subject of this invention is broadly denoted by the numeral 10 and includes a substantially U-shaped frame 12 formed by a bight 14 and a pair of arms 16 depending from the ends of bight 14. Apparatus 10 is adapted to be utilized in raising one end of a vehicle so that the vehicle may subsequently be towed from one location to another.

Bight 14 is comprised of a pair of elongated, spaced stretches 18 and 20 which are interconnected by an elongated bracing member 22, as illustrated in FIG. 4. A normally vertical bracing member 24 increases the structural rigidity of bight 14 at the center of the latter. A pair of polygonally-shaped plates 26 are secured to opposed sides of bight 14 at each end respectively of the latter, and plates 26 are provided with aligned openings 28 therein for adjustably mounting arms 16 on bight 14.

Each arm 16 is provided with a bifurcated, normally uppermost end 30 having a pair of spaced openings therein for alignment with a pair of the openings 28 in plates 26 at the corresponding end of bight 14, and for receiving pins 32 for interconnecting arms 16 with bight 14.

Each arm 16 is provided with a pair of fingers or arm sections 34 and 36 thereon at the lower end thereof. Finger 34 is integral with arm 16 and is directed rearwardly and inwardly of the lower end of arm 16 as illustrated in FIGS. 4 and 5. Finger 36 is pivotally mounted on the lower end of arm 16 by means of a U-shaped element 38 and a pin 40 passing through aligned openings in element 38 and the upper end of finger 36, it being noted that finger 36 is provided with an upright portion 42 disposed adjacent the lower end of arm 16 and generally parallel therewith when fingers 34 and 36 are in the positions illustrated in FIG. 5. A take-up device 44 in the nature of a J-shaped screw is carried by finger 36 and is operably coupled with the lower end of arm 16 for maintaining fingers 34 and 36 in fixed positions.

Saddle means broadly denoted by the numeral 46 is provided for each arm 16 for disposition beneath a corresponding wheel of the vehicle to be elevated. Saddle means 46 includes a pair of shoes 48 and 50 secured to the lower ends of fingers 34 and 36 respectively. Each of the shoes 48 and 50 is provided with a generally concave, uppermost surface 52 adapted to complementally engage the outer periphery of the corresponding wheel of the vehicle, it being clear that each finger 34 and 36 is provided with an inwardly extending projection 54 thereon at the lower end thereof to which the corresponding shoe 48 or 50 is attached. A chain 56 is connected to suitable hooks 58 at the lower ends of fingers 34 and 36 to assure that fingers 34 and 36 are inseparable should take-up means 44 be omitted.

Strips 60 are secured to projections 54 at the innermost ends of the latter, strips 60 being inwardly and upwardly directed to prevent the wheel of the vehicle from slipping off the adjacent shoe 48 or 50.

Figure 2:
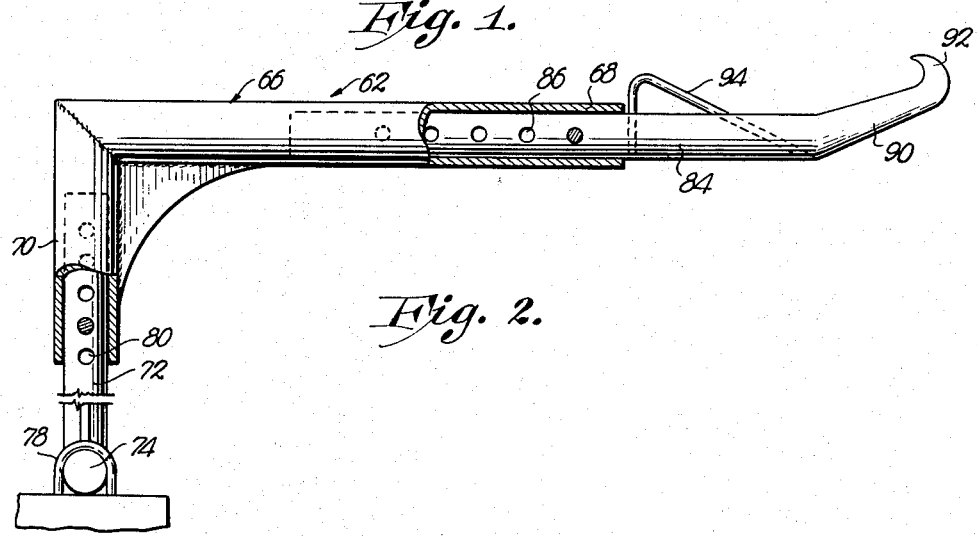
FIG. 2 is an enlarged, side elevational view of the boom structure adapted to be coupled with a towing device for elevating the apparatus illustrated in FIG. 1, parts being broken away and in section to reveal details of construction.

Boom structure broadly denoted by the numeral 62, is swingably mounted on a support 64 in the nature of the rear end of a towing device, such as a towing truck, and is operably coupled with apparatus 10 for elevating the end of the vehicle to be towed. Structure 62 comprises an L-shaped, tubular boom 66 having a generally horizontal section 68, and a generally vertical section 70 as illustrated in FIGS. 1 and 2. Section 70 telescopically receives a cylindrical section 72 having a crossbar 74 thereon swingably mounted to the upper surface 76 of support 64 by U-shaped coupling members 78 secured to support 64. Section 72 is provided with a plurality of longitudinally spaced openings 80, and section 70 is provided with an opening for receiving a pin 82 passing through one of the openings 80 in section 72. It is evident that the height of section 68 may be controlled by selecting an appropriate opening 80 through which pin 82 is disposed.

A tongue section 84 is telescopically received within section 68 and is provided with longitudinally spaced openings 86 therein for alignment with an opening in section 68 to thereby receive a pin 88 through the opening 86 aligned with the opening in section 68. Thus, tongue section 84 may extend outwardly from boom 66 to a greater or lesser degree.

Figure 3:
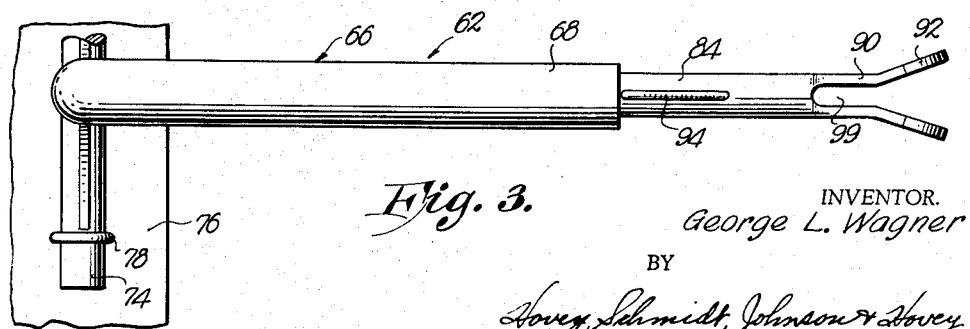
FIG. 3 is a plan view of the boom structure illustrated in FIG. 2, and more particularly, showing the bifurcated, outermost end thereof for interconnection with the apparatus.

Section 84 is provided with a bifurcated, outermost end 90 as illustrated in FIG. 3, and is further provided with a hook 92 on each of the bifurcations at end 90, it being clear that end 90 is inclined relative to the longitudinal axis of section 84 as is illustrated in FIG. 2, to dispose hook 92 above section 84 when the latter is substantially horizontal.

An eyelet 94 formed by bending an elongated rod in the form of a loop, and securing the ends of the rod to the uppermost surface of section 84, is provided for receiving a hook 96 at one end of a cable 98 trained over a pulley (not shown) rotatably mounted on an upright standard (not shown) carried by support 64 forwardly of crossbar 74. The opposite end of cable 98 is adapted to be coupled with a winch (not shown) carried by support 64 forwardly of the standard.

Boom structure 62 is adapted to be secured to apparatus 10 by disposing end 90 of tongue section 84 below stretch 18 with bracing member 24 disposed within a slot 99 formed at the end 90 of section 84. In this position, the hook 92 is disposed above stretch 18 to preclude substantial movement of bight 14 off section 84.

In operation, apparatus 10 is disposed on tongue section 84 as shown in FIG. 1, and support 64 is moved into position forwardly of a vehicle 100, such as an automobile, so that bight 14 overlies the latter and arms 16 depend from bight 14 alongside the wheels 102 of vehicle 100. One of the pins 32 on each side of bight 14 is removed to permit arms 16 to swing laterally and away from each other prior to the placement of frame 12 in straddling relationship to the end of the vehicle 100 having wheels 102 thereon. Also, fingers 34 and 36 on each arm 16, are spread slightly apart by virtue of swinging finger 36 about pin 40 so that when arms 16 are swung toward each other about the remaining pins 32, shoes 48 and 50 and strips 60, are able to clear the corresponding wheel 102 for placement in operative positions fore and aft of the wheel 102. Thereupon, the fingers 34 and 36 are swung toward each other and take-up means 44 is manipulated to maintain the fingers 34 and 36 in operative positions. In these positions, shoes 48 and 50 associated with each arm 16, are positioned adjacent the lowermost portion of wheel 102 with surfaces 52 complementally engaging the outer periphery of wheel 102 as illustrated in FIG. 1. Also, strips 60 are located adjacent the inner surface of wheel 102 to preclude outward movement of the associated arm 16 in the event that swaying motion of apparatus 10 occurs. Chain 56 is then placed in the position illustrated in FIG. 5 to preclude separation of fingers 34 and 36. A safety chain 104 is secured to the rear of support 64 and to the underside of vehicle 100 to maintain control of the latter in the event of malfunction of apparatus 10 during towing.

The winch on support 64 is then actuated to draw cable 98 upwardly and thus to swing boom structure 62 about the longitudinal axis of crossbar 74. Upward movement of structure 62 causes bight 14 to elevate and swing with tongue section 84 in a vertical arc. Arms 16 are then elevated to raise shoes 48 and 50 which are disposed in supporting relationship to wheels 102. Thereupon, support 64 may be moved to tow vehicle 100 therewith, vehicle 100 being supported at the opposite end thereof on the wheels at said opposite end.

Should the apparatus 10 have a tendency to sway during towing thereof, strips 60 would preclude outward movement of arms 16 relative to vehicle 100 to thereby protect against the shearing of pins 32 interconnecting arms 16 with bight 14. By virtue of the construction of bight 14 and the manner in which the latter is interconnected with tongue section 84, there would be little or no fore and aft swaying movement, and there is sufficient clearance between the rear of support 64 and the front of a vehicle 100 to compensate for such slight fore and aft swaying movement.

It is not necessary that bight 14 be elevated to a great extent, it being clear that it is sufficient to elevate the latter only a distance sufficient to raise the wheels 102 above ground level for proper towing of vehicle 100.

At the destination, bight 14 is lowered by manipulating the winch coupled with cable 98 and, when wheels 102 engage a supporting surface therebelow, fingers 34 and 36 may be swung away from each other and arms 16 swung outwardly from vehicle 100 to remove apparatus 10 from the latter.

By virtue of the construction of apparatus 10, no need is required to hoist vehicle 100 by the axle or the body shell such as the bumper or the like, prior to towing thereof. It is, therefore, evident that damage to these parts of the vehicle 100 are substantially precluded by engaging wheels 102 in supporting relationship thereto to elevate the wheels and in turn to elevate the end of vehicle 100 having wheels 102 thereon.

Having thus described the invention, what is claimed as new and desired to be secured by Letters Patent is:

An assembly for attachment to a tow truck for lifting and towing a vehicle comprising:

a substantially U-shaped frame having a generally horizontal, rigid bight section adapted for overlying the vehicle transversely thereof as the latter is towed;

a pair of spaced arms depending from opposite extremities of said bight section, each arm being provided adjacent the lowermost extremity thereof with a pair of arm sections and means pivotally mounting one arm section for movement relative to the other arm section, each arm section being provided at the lower end thereof with a shoe, the shoes of said arm sections being spaced apart to present a saddle extending substantially transversely of the plane of the frame and disposed for receiving and supporting a corresponding wheel of the vehicle when the frame is raised, said one arm section being movable in opposed directions through a distance sufficient to permit the shoe thereof to shift toward and away from the shoe of the other arm section to thereby permit adjustment of the shoes with respect to the peripheral surface of the wheel supported thereby; and a boom structure adapted to be secured to said tow truck in disposition projecting rearwardly therefrom, said frame having a generally vertical member intermediate the ends of said frame and said boom structure being provided with an elongated, substantially fork-shaped hook section having a pair of parallel, normally rearwardly extending elements releasably engageable with said bight section of the frame on opposite sides of said member in embracing relationship thereto, said elements being spaced apart a distance only slightly greater than the effective transverse dimension of said member to preclude swinging of the frame about a generally horizontal axis extending longitudinally of the hook section without interfering with pivoting movement between the frame and hook about axes extending longitudinally of the bight section of the frame and longitudinally of the member.

References Cited by the Examiner

UNITED STATES PATENTS

| | | | |
|---|---|---|---|
| 1,178,829 | 4/16 | Stone | 294—67 X |
| 1,520,194 | 12/24 | Matthews. | |
| 1,677,695 | 7/28 | Vogt | 289—81 X |
| 1,736,016 | 11/29 | Rosener | 294—67 X |
| 2,078,819 | 4/37 | Van Brummelen | 214—67 |
| 2,687,223 | 8/54 | Walter | 214—77 X |
| 2,951,601 | 9/60 | Castoe. | |
| 3,018,005 | 1/62 | Renshaw | 212—8 |
| 3,020,078 | 2/62 | Ray | 294—67 X |
| 3,032,205 | 5/62 | Reed | 212—8 |
| 3,045,848 | 7/62 | Christenson et al. | 214—392 |
| 3,045,852 | 7/62 | Boyd | 214—653 |

FOREIGN PATENTS

| | | |
|---|---|---|
| 317,293 | 12/19 | Germany. |
| 385,467 | 12/32 | Great Britain. |

HUGO O. SCHULZ, *Primary Examiner.*

MORRIS TEMIN, *Examiner.*